(12) United States Patent
Hogg

(10) Patent No.: US 7,689,632 B2
(45) Date of Patent: Mar. 30, 2010

(54) ADAPTIVE DATA DICTIONARY LANGUAGE, EXTENDABLE FOR A SECURITY SYSTEM

(75) Inventor: David Hogg, Falkirk (GB)

(73) Assignee: Honeywell International Inc., Morristown, NJ (US)

( * ) Notice: Subject to any disclaimer, the term of this patent is extended or adjusted under 35 U.S.C. 154(b) by 905 days.

(21) Appl. No.: 11/292,033

(22) Filed: Dec. 1, 2005

(65) Prior Publication Data
US 2007/0130184 A1    Jun. 7, 2007

(51) Int. Cl.
*G06F 17/30* (2006.01)
(52) U.S. Cl. .................... 707/803; 700/1; 717/121
(58) Field of Classification Search .......... 700/1; 717/121; 707/999.1, 104.1
See application file for complete search history.

(56) References Cited

U.S. PATENT DOCUMENTS

| | | | | |
|---|---|---|---|---|
| 4,068,300 | A | * | 1/1978 | Bachman ................. 707/1 |
| 4,868,185 | A | | 9/1989 | Chucholowski et al. |
| 5,694,598 | A | * | 12/1997 | Durand et al. .......... 707/103 R |
| 5,966,531 | A | | 10/1999 | Skeen et al. |
| 6,157,932 | A | | 12/2000 | Klein et al. |
| 6,609,127 | B1 | | 8/2003 | Lee et al. |
| 7,039,511 | B1 | * | 5/2006 | Kreuz et al. ................. 701/36 |
| 2001/0008024 | A1 | | 7/2001 | Inaba |
| 2003/0177486 | A1 | | 9/2003 | Bakke et al. |
| 2004/0015890 | A1 | | 1/2004 | Wong et al. |
| 2005/0216432 | A1 | | 9/2005 | Harris et al. |
| 2005/0223372 | A1 | * | 10/2005 | Borchers ................. 717/168 |
| 2005/0231756 | A1 | | 10/2005 | Maeshima |
| 2006/0242207 | A1 | * | 10/2006 | Tsyganskiy et al. ......... 707/203 |

* cited by examiner

*Primary Examiner*—Hosain T Alam
*Assistant Examiner*—Johnese Johnson
(74) *Attorney, Agent, or Firm*—Busch Blackwell Sanders Welsh & Katz

(57) ABSTRACT

A system, method and computer program product for storing configuration data for use in configuring a device while a program utilizing the configuration data is undergoing a revision at the device. The method includes a first step of providing a data structure indicating a manner in which configuration data is to be stored, and storing the data structure and current configuration data according to the data structure. Then, a revised software program in the device may identify the data structure and access a particular configuration data, along with its format; and, apply a conversion function that translates the stored current configuration data to a format compatible for use by the revised software. This is accomplished in a manner such that no configuration data is corrupted. The data structure includes data self describing the stored current configuration data, such that a conversion function can easily access the self describing information and render the stored configuration data platform independent.

29 Claims, 2 Drawing Sheets

ADAPTIVE DATA DICTIONARY LANGUAGE, EXTENDABLE FOR A SECURITY SYSTEM

FIELD OF THE INVENTION

This invention relates generally to the field of security systems, and in particular to a manner for reconfiguring control panels associated with various security devices and particularly, to enable automated software configuration data updates as software versions of a control panel change.

BACKGROUND OF THE INVENTION

Security systems offer a degree of security for residential sites and for office, business, or industrial applications. Typically, a security device monitoring or controlling a zone is provided as part of a security system. For example, an alarm may be set, which is triggered upon the occurrence of various threat or alarm conditions. At a larger installation, such as in a business, industrial or office setting, more than one zone and security device may be provided at various locations of the site. The security devices are typically connected (via hardwired or wireless connections) to a security control panel, which is essentially a control board or control module for security for the site. Also, a remote central monitoring station may be connected, and this central station may be notified when fault, a threat condition, or some other type of security breach, a fire condition, or other type of emergency condition or the like is detected.

As known, the control module or device coordinates the functioning of the units or modules implementing the security and may comprise an integrated circuit, such as a chip to execute software modules for the functioning of a keypad, for example. Control modules may be configured as hardware, software, firmware, or some combination of the foregoing. In several hardwired systems, it is advantageous that the control panel communicates with a peripheral device (e.g., a security or sensor device) over wired or wireless bus systems, such as RS485, or a device that can be plugged directly onto the control panel and governed by a Serial Peripheral Interface (SPI). As known, the SPI protocol enables synchronous serial communication of a host processor (control panel) and peripherals.

Currently, there is a need to store configuration data from a panel to a remote site or device, as well as being able to restore a configuration to a panel. This is typically done when upgrading the software on the panel, which had been typically performed by replacing the memory chip that held the control program. The configuration data is stored, the memory chip changed, then the configuration information restored. In one prior art embodiment, depicted in FIG. 1A, configuration information can be retrieved from a panel 12 and stored using a PC (personal computer) application 15. Basically, the PC knows about the differences in data between different versions of the alarm panel software and can send any stored configuration information to the panel in the specific format.

One problem with this method is that if the format of the data changes between software versions, the software on the RS232 module may have to be updated as well as the software on the PC. The configuration file would also have to be modified to allow the upgraded software to understand it. Occasionally, some of the required configuration data format changes are not carried out—thus leading to incompatibility between the panel and the RS232 module 18 when used as a temporary storage device for panel configuration data as shown in FIG. 1B. Currently, in the embodiment depicted in FIG. 1B, the RS232 module knows the structure of the data and can mimic the PC and retrieve and store the configuration information. That is, the RS232 module can be told about the differences in data between different versions of the alarm panel software and can send any stored configuration information to the panel in the specific format.

However, it is the case that when the panel data is reloaded from the RS232 module, not all the configuration data is restorable.

In the next generation security control panels, the type of memory device that stored the program and configuration are changed to the extent that the chip is no longer replaceable. Consequently, a new way has to be devised in order to upgrade the program implemented at the panel.

It would be desirable therefore, to provide an efficient system and method for saving and restoring panel configuration data when making new panel software updates.

BRIEF SUMMARY OF THE INVENTION

A method and apparatus for enabling saving and restoring of panel configuration data when making new panel software updates is provided. To this end, a new data format is devised to allow configuration information to be platform independent.

According to the invention, an adaptive data dictionary that stores the configuration data, is extended to additionally store the format of the data, thus allowing other versions of the panel software to read the format of the data and automatically apply any conversions required. Particularly, the devised solution employs a newly created SPI key, which consists of a memory device that uses the SPI protocol. Use of such a key enables the upgraded software to be able to read the same configuration file back without the need of any intervention or code overhead that would need to understand what the data changes were between specific versions of the software.

In such a system, the dedicated memory key is accessed via the SPI protocol that allows the saving and restoring of the configuration information. To this end, each data element to be restored is provided with enough detail to allow a different version of software to read, understand, and, if necessary, convert the data to the required format.

Thus, according to a first aspect of the invention there is provided a method and computer program product for storing configuration data for use in configuring a device while a program utilizing the configuration data is undergoing a revision at the device. The method includes a first step of providing a data structure indicating a manner in which configuration data is to be stored, and storing the data structure and current configuration data according to the data structure. Then, a revised software program in the device may identify the data structure and access a particular configuration data, along with its format; and, apply a conversion function that translates the stored current configuration data to a format compatible for use by the revised software. This is accomplished in a manner such that no configuration data is corrupted. The data structure includes data self describing the stored current configuration data, such that a conversion function can easily access the self describing information and render the stored configuration data platform independent.

According to a further aspect of the invention, there is provided a system and method for saving and restoring alarm panel configuration data provided in a security system when making new alarm panel software updates. The method comprises:

providing a memory storage means for storing alarm panel configuration data according to an ordered pattern indicated by a first data structure;

utilizing the first data structure to facilitate read/write access to the stored alarm panel configuration data; and performing a conversion if a format of the alarm panel configuration data changes in the device being updated.

According to this further aspect of the invention, the first data structure comprises: an Identifier for indicating a class of stored panel configuration data to be used by alarm panel; a first count as to the actual number of ITEMS represented by the class; and a second count of the number of discrete data items that make up an individual item, thereby providing a summary of what current alarm panel configuration data is being stored. Moreover, one or more second data structures are provided that comprise, for each ITEM in the first data structure, the identity of one or more FIELDS (ID) and a field type (TYPE) indicating a data type.

The data types defined include, but are not limited to: 8 bit signed integers, 8 bit unsigned integers, characters, 16 bit signed integers, 16 bit unsigned integer, 32 bit signed integer, 32 bit unsigned integer, 64 bit signed integer, 64 bit unsigned integer, float, array, double, group map, string, or a mask test.

Advantageously, the method includes steps for format conversion of a data structure comprising one or more dimensioned array, the method including executing a function implementing logic adapted for translating arrays with dimensional difference between device program revisions, the data structure defined as an array type having a number of elements stored with the details of what dimension it represents.

According to a further aspect of the invention, there is provided a data structure for self describing configuration data information for use in a device being updated with a software or hardware revision. The data structure comprises:

one or more ETYMON structures describing configuration data for a device, each the ETYMON structure describing a number of individual structures (ITEMs), and a number of discrete data items (FIELDS) that make up an ITEM, thereby providing a summary of how device data is stored in a storage device; and, one or more MORPHEME structures indicating the identity of one or more FIELDS, a type of the field (TYPE), and, a size used for the data (SIZE) for each ITEM in an ETYMON structure for storage in the storage device;

wherein the data structure enables a revisioned device to identify a particular piece of data configuration, along with its format; and, apply the appropriate conversion function for translating the stored data to the correct format for the current revisioned device trying to read the stored data.

The data structure for self describing configuration data information according to this aspect of the invention includes a pattern governed by the one or more ETYMON and MORPHEME structures according to: E, nMD, E, nMD, E, nMD, E, nMD, E, nMD, E, nMD, E, nMD, etc. where E identifies an Etymon structure and nMD represents a number of Morpheme/Configuration Data couplets being stored according to a number of ITEMs indicated in the ETYMON structure, where n is an integer ≧ than 1.

Advantageously, the data structure for self describing configuration data information stored according to the pattern, facilitates access by a conversion function for performing conversion if data format changes in the device being upgraded.

DETAILED DESCRIPTION OF THE INVENTION

Aspects of the invention will be described with reference to FIG. 2, which is a schematic diagram of a security control node or alarm panel 12 that may be connected via a socketed connection to a newly created memory device key 20, that enables the upgraded alarm panel software to be able to read the same configuration file back without the need of any intervention or code overhead that would need to understand what the data changes were between specific versions of the software.

As mentioned, when a panel software is upgraded, it may be that the structure or contents of internal data structures change, such that the information cannot be retrieved a simply as it can be written. To this end the 'Adaptive Data Description Language, Extendible', (ADDLE) is used. In order to reduce the work load required, the system of the invention will be product (e.g., alarm panel) centric; that is, a vocabulary is derived for one product type, although it is contemplated that one vocabulary may be derived for more than one product type.

The ADDLE language is able to define a data class, e.g., a user the user having related information of a given type, possibly contained within a given structure. If this structure changes between software versions, then according to the invention, the ADDLE vocabulary assists in mapping the stored information, of the previously recorded data, to the relevant parts of the currently active data with no corruption of the data. Once specified, the vocabulary can be added to, but it cannot be removed from. It may be necessary to provide certain conversion functions for each class, as and when a change in software requires it.

Figure 1A:
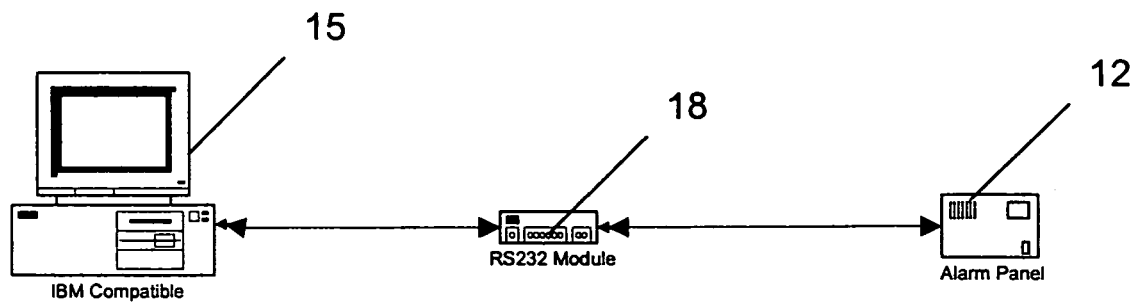
FIGS. 1A and 1B illustrate diagrams detailing of the current solution for storing and retrieving configuration information from a panel to be modified.
Figure 1B:
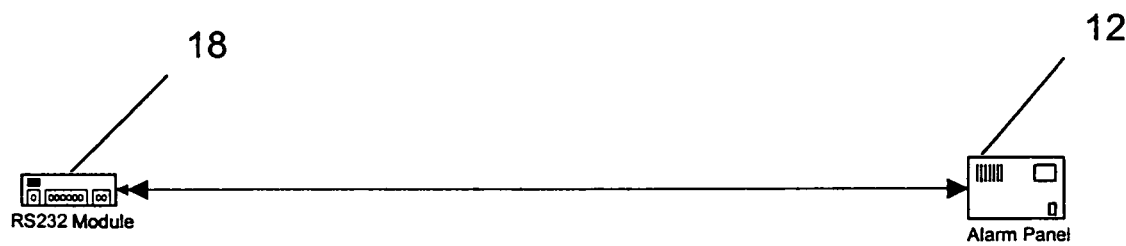
Figure 2:
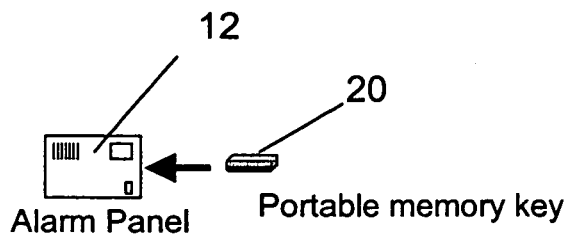
FIG. 2 illustrates a diagram detailing of the solution for storing and retrieving configuration information from a panel to be modified according to the present invention.

As shown in FIG. 2, using ADDLE, the data is self describing and therefore the panel 12 itself can store and retrieve configuration information without the need for the data to be converted by an external device, that in itself needs to be updated with the details of any change in data formats. This is accomplished using a memory device 20 that connects directly to the alarm panel and referred to herein as the SPI key 20.

The general structure of an ADDLE class is now described as follows:

| Name | Type | Description |
| --- | --- | --- |
| CLASS_ID | Enum | The related panel information. I.e. user info, zones, groups etc. |
| NUM_ITEMS | int | The number of 'class items' that follow. I.e. number of users, zones etc |

-continued

| Name | Type | Description |
| --- | --- | --- |
| NUM_ITEM_FIELDS | int | The number of FIELD elements in the structure. |

The structure of a FIELD element within the class will be as follows:

| Name | Type | Description |
| --- | --- | --- |
| FIELD_ID | Enum (UINT16) | Enum for the related field, i.e. user_name |
| FIELD_TYPE | Enum (UINT16) | UINT, INT, STRING, GROUP_MAP, etc |
| FIELD_SIZE | UINT16 | Number of bit in the data. |
| FIELD_MAX | UINT16 | Any maximum value associated with the field |
| FIELD_MIN | UINT16 | Any minimum value associated with the field |

As will be described in greater detail herein, functions are defined that will handle each data class, and associated fields, and write and read data using the correct format and actual structure items.

In one example embodiment of an alarm panel product, for which ADDLE is implemented, there are several data structures that hold details of the configuration of the alarm panel. These data structures are composed of one or more discrete data items. Therefore, there is a particular format to the data within the system. This format includes: an Identifier that is created for the main data structure, to allow it to be recognized. Along with this Identifier is a first count as to the actual number of these data structures stored called ITEMs, and a second Count of the number of discrete data items that make up the ITEM data structure called FIELDS.

This Identifier, number of individual structures (i.e., ITEMs), and number of discrete data items that make up an ITEM (i.e., FIELDS) information forms a summary of what data is stored and is itself, stored before the actual data. In an example implementation, written in C programming language, this summary structure is called the ADDLE_ETYMON_STRUCT_T.

For each identified FIELD there has to be preceding information that describes the nature of the data, which will facilitate its conversion when being read back by a version of software with or without the same data structure for that FIELD. In an example embodiment of an alarm panel, there are fifteen (15) discrete data types within the panel, i.e., 15 basic data types needed to describe the available data within the system: These are: 8 bit signed integers, 8 bit unsigned integers, characters, 16 bit signed integers, 16 bit unsigned integer, 32 bit signed integer, 32 bit unsigned integer, 64 bit signed integer, 64 bit unsigned integer, float, array, double, group map, string, mask test.

In one example implementation, e.g., written in the C programming language, these are created as enumerated types. The functions defined for handling each data class are provided to allow the storage and retrieval of the above types, with the retrieval functions carrying out some basic processing to handle any change in data type.

The information required is the identity of the field, ID, the type of the field, TYPE, then number of bits used for the data, SIZE, and any applicable maximum and minimum values. In one example implementation, written in C, this structure is called the ADDLE_MORPHEME_STRUCT_T.

Thus, according to the invention, if the data structure for a particular field changes significantly, e.g., from an 8 bit signed integer to a character array, then a new FIELD_ID should be added as there is no obvious means of translation between the two types. Further to this, ID's can only be created, and not removed, so as to avoid disrupting the ADDLE system. Thus, for example, if the ID for USERS, were removed and later used for ZONES, then if the data retrieved was from an older variant the ADDLE processing would attempt to use USER information to configure the ZONE information. The same is true for the identified types. If more types are required, then they must be added at the end and once in, never deleted.

To make use of ADDLE, routines are written to read and write the data. As the intention of ADDLE is to permit automatic conversion then the functions will call the functions that represent the current format of the data. It is within these called functions that the conversion takes place.

As a result of defined data structure, the ADDLE Storage Format of the information follows the following pattern, with a number of MORPHEME/DATA couplets being dictated by the number of ITEMS identified in the ETYMON structure:

| ETYMON | MORPHEME | DATA | MORPHEME | DATA | MORPHEME | DATA |
| --- | --- | --- | --- | --- | --- | --- |

This structure will be repeated, for every Etymon identified, as explained in greater detail hereinbelow where Etymon is represented by E and nMD represents any number of Morpheme/Configuration Data couplets.

| E | nMD | E | nMD | E | nMD | E | nMD | E | nMD | E | nMD | E | nMD |
| --- | --- | --- | --- | --- | --- | --- | --- | --- | --- | --- | --- | --- | --- |

The ADDLE conversion routines compare the data type information for the current software with that of the data type information of the stored, or archived data. Often this is simply a case of the newest (updated) version of the software possibly using a larger data type than the previous version, in which case the older data is copied to the new type with no conversion whatsoever.

In another conversion example, the ADDLE conversion routines convert a signed quantity (e.g., number) to an unsigned version. This conversion requires removing the sign information and storing the value as a positive magnitude, regardless of the initial sign of the data. Again, if there are different storage sizes, then this also needs to be accounted for. However, as described hereinabove, the majority of structure changes result in an increase in the storage space required, and as such the conversion routines is kept simple.

In another more complex conversion example, the conversion routine involves arrays, where the number of dimensions of an array directly impacts the storage; thus, any change to the number of dimensions needs to be very carefully managed. The current implementation of the array conversion assumes that the maximum number of dimensions for an array to be a fixed number, e.g., five (5). This is an arbitrary number and may be chosen according to particular panel configuration which typically require storage for at least three (3). Dimensional data. Thus, the ADDLE implementation accounts for an additional 2 dimensions to further safeguard against being impacted by future changes. If there are unrecognized, or unused fields, then the data held within the Morpheme is sufficient for this data to be passed over and the next morpheme retrieved.

The structure and function of the Adaptive Data Description Language, Extendible (ADDLE) is now described. ADDLE enables a data structure within a given piece of software to be described in such away that a different, e.g. newer version of, software would be able to identify the particular piece of data, along with its format; and, apply the appropriate conversion function that translates the stored data to the correct format for the current piece of software trying to read the stored data. This means that even though the data format may change between software upgrades, there is no need to convert any archived configuration data as its structure and format can be understood and automatically converted.

The previous method of saving and restoring data meant that if the structure were changed, then the archiving tool would also need updating along with the software being upgraded. More than this, the archiving tool would need to have specific conversion routines depending on the initial software version and the version being upgraded to, which represents a significant overhead. ADDLE Removes this overhead as the data describes itself and therefore conversion becomes more straightforward.

The following are illustrative functions defined to handle each data class, and associated fields, and write and read data using the correct format and actual structure items.

A "read_addled_group_map" function: is a generic function that is used to read a group map from the configuration file on the SPI Key and applying any necessary conversion should the stored format be different to that required by the current software. An example implementation for declaring this function is written in the C programming language as follows:
UINT16 read_addled_group_map(const ADDLE_MORPHEME_STRUCT_T *field, UINT8 *data)

This read_addled_group_map function implements logic that essentially compares the sizes of the current group map and the stored group map. If the group map of the current software is smaller than the group map of the stored data, then only the size that is supported is read. If the group map of the current software is larger than the group map of the stored data, therefore the size of the data that is stored needs to be read. In this case, blanks may need to be inserted into the destination group map to account for the bytes not being read.

A "read_addled_bit" function is a generic function that is used to read a bit from the configuration file on the SPI Key and applying any necessary conversion, should the stored format be different from that required by the current software. An example implementation for declaring this function is written in the C programming language as follows:
UINT16 read_addled_bit(const ADDLE_MORPHEME_STRUCT_T *field, UINT8 *data)
{

In this read_addled_bit function, even though it is unlikely for a bit variable to exceed a byte in storage, this possibility is still checked.

A "read_addled_byte" function is a generic function that is used to read a byte from the configuration file on the SPI Key and applying any necessary conversion, should the stored format be different from that required by the current software. An example implementation for declaring this function is written in the C programming language as follows:
UINT16 read_addled_byte(const ADDLE_MORPHEME_STRUCT_T *field, UINT8 *data)
{

A "read_addled_word" function is a generic function that is used to read a word from the configuration file on the SPI Key and applying any necessary conversion, should the stored format be different from that required by the current software. An example implementation for declaring this function is written in the C programming language as follows:
UINT16 read_addled_word(const ADDLE_MORPHEME_STRUCT_T *field, UINT8 *data)
{

A "read_addled_long" function is a generic function that is used to read a long from the configuration file on the SPI Key and applying any necessary conversion, should the stored format be different from that required by the current software. An example implementation for declaring this function is written in the C programming language as follows:
UINT16 read_addled_long(const ADDLE_MORPHEME_STRUCT_T *field, UINT8 *data)
{

A "read_addled_float" function is a generic function that is used to read a float from the configuration file on the SPI Key and applying any necessary conversion, should the stored format be different from that required by the current software. An example implementation for declaring this function is written in the C programming language as follows:
UINT16 read_addled_float(const ADDLE_MORPHEME_STRUCT_T *field, UINT8 *data)
{

A "read_addled_double" function is a generic function that is used to read a double from the configuration file on the SPI Key and applying any necessary conversion, should the stored format be different from that required by the current software. An example implementation for declaring this function is written in the C programming language as follows:
UINT16 read_addled_double(const ADDLE_MORPHEME_STRUCT_T *field, UINT8 *data)
{

A "read_addled_array" function is a generic function that is used to read a byte array from the configuration file on the SPI Key and applying any necessary conversion, should the stored format be different from that required by the current software. An example implementation for declaring this function is written in the C programming language as follows:
UINT16 read_addled_array(const ADDLE_MORPHEME_STRUCT_T *field, UINT8 *data, UINT16 addle_type, UINT16 dest_size, int num_indices, With respect to data configured for storage in an array, special consideration is required when translating arrays, especially where there are dimensional differences. In one embodiment, ADDLE assumes that the largest number of dimensions for a single array range up to five (5), however, this may be configurable according to the specific panel configuration. Each dimension is written as an array type and the number of elements is written along with the details of what dimension it represents. This is done for each dimension, and once this has been completed the data can be written to the key in the standard format, giving the data type as would be done for any other single instance of an item of that type and repeated for each element of each dimension. Reading the data back is now described. A single dimensioned array is stored in consecutive memory locations a1-a6 as depicted:

| a1 | a2 | a3 | a4 | a5 | a6 |

If the array dimensions and size are not changed, then the array can be read as a whole and written to the new location, even if the number of elements within the dimension are increased. If the size of the type in this array were to be changed, but it remained a single dimensioned array, then the conversion requires steps of: reading each element from the array, individually, and storing in the new size. For example, if the size of each element in the array were doubled, then the following diagram depicts how the new array would be stored:

| a1 | a2 | a3 | a4 | a5 | a6 |

The processing additionally addresses the scenario where the number of elements decreases and will have to skip the unused array elements before finishing. This is more relevant for multidimensional arrays as the data for subsequent dimensions is stored after the data for the current dimension.

The handling of multidimensional arrays follows a similar method, however it is repeated depending on the number of dimensions that the array has. Due to the nature of the storage and retrieval of the information, the number of dimensions directly impacts the data space required to process the arrays, thus, there may be a limit to the number of dimensions for any given array in a system with limited storage space. In one example embodiment, there is considered a three dimensional array, with each dimension having 3 elements and the memory footprint as detailed below:

| a1 | a2 | a3 | a4 | b1 | b2 | b3 | b4 | c1 | c2 | c3 | c4 |

If this were to be changed to another 3 dimensional array that had 6 elements per dimension then the memory footprint would be as follows:

| a1 | a2 | a3 | a4 | a5 | a6 | b1 | b2 | b3 | b4 | b5 | b6 | c1 | c2 | c3 | c4 | c5 | c6 |

Figure 3:
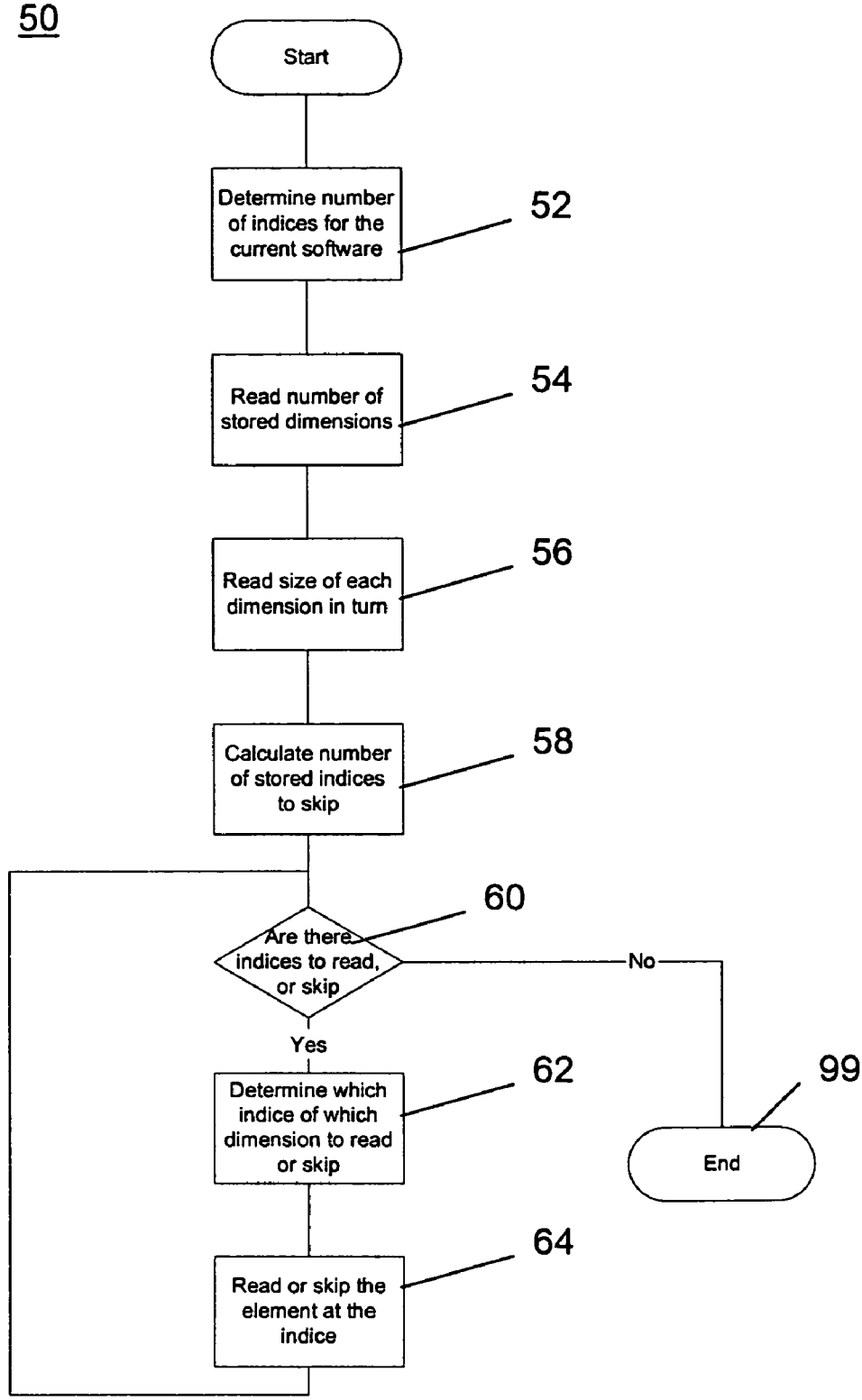
FIG. 3 illustrates a flow chart depicting the methodology implemented by the ADDLE read_addled_array function for converting arrayed configuration data.

The number of dimensions and elements per dimension impacts the conversion routing as well as the size of each element. A methodology as performed by the read_addled_array function for processing an array is described with reference to FIG. 3. According to the methodology, the size required to store the array that is located on the key is first calculated. Then, the field details are checked and the size of the stored data is compared with that of the current software. If the stored size is greater, then only an amount that is enough to fill the destination size is read. If the stored size is smaller, or the same, then the stored size is read. The method steps depicted in FIG. 3, are performed to perform this functionality. In a first step 52 the number of indices that the current software version accommodates is determined. Then, at step 54, the number of stored dimensions is read. Next, at step 56, the size of each dimension is then read, in turn. Then, at step 58, the number of stored indices to skip is calculated. Proceeding to step 60, a decision is then made as to whether there are any indices to read, or skip. Such a situation arises if the stored element size is greater than the live element size, then besides the array having to be read one (1) element at a time, the additional bytes will have to be skipped over. If there are no indices to read or skip, then the process ends at step 99. However, if it is determined at step 60 that there are indices to read, or skip, then the process proceeds to step 62 which represents the step of determining which indice of which dimension to read or skip. Afterwards, as depicted at step 64, the element at the indice is either read or skipped and the process returns to step 60.

A "skip_addled_field" function is a generic function that is used to skip an addle field. This is used when the current software has less of a given item that the software used to store the information. An example implementation for declaring this function is written in the C programming language as follows:
UINT16 skip_addled_field(const ADDLE_MORPHEME_STRUCT_T *field)
{

A "skip_addled_items" function is a generic function that is used to skip a given number of addled items. This is used when the current software has less of a given item that the software used to store the information. An example implementation for declaring this function is written in the C programming language as follows:
UINT16 skip_addled_items(const ADDLE_ETYMON_STRUCT_T *etymon, UINT16 num_items_to_skip)
{

A "write_addled_group_map" function is a generic function that is used to write a group map to the configuration file on the SPI Key and applying any necessary conversion. An example implementation for declaring this function is written in the C programming language as follows:
UINT16 write_addled_group_map(UINT16 field_id, UINT8* data)

A "write_addeld_bit" function is a generic function that is used to write a bit to the configuration file on the SPI Key and applying any necessary conversion. An example implementation for declaring this function is written in the C programming language as follows:
UINT16 write_addled_bit(UINT16 field_id, UINT8* data)

A "write_addeld_byte" function is a generic function that is used to write a byte to the configuration file on the SPI Key and applying any necessary conversion. An example implementation for declaring this function is written in the C programming language as follows:

UINT16 write_addled_byte(UINT16 field_id, UINT8* data)

A "write_addled_word" function is a generic function that is used to write a word to the configuration file on the SPI Key and applying any necessary conversion. An example implementation for declaring this function is written in the C programming language as follows:

UINT16 write_addled_word(UINT16 field_id, UINT8* data)
{

A "write_addled_long" function is a generic function that is used to write a long to the configuration file on the SPI Key and applying any necessary conversion. An example implementation for declaring this function is written in the C programming language as follows:

UINT16 write_addled_long(UINT16 field_id, UINT8* data)
{

A "write_addled_float" function is a generic function that is used to write a float to the configuration file on the SPI Key and applying any necessary conversion. An example implementation for declaring this function is written in the C programming language as follows:

UINT16 write_addled_float(UINT16 field_id, UINT8* data)
{

A "write_addled_double" function is a generic function that is used to write a double to the configuration file on the SPI Key and applying any necessary conversion. An example implementation for declaring this function is written in the C programming language as follows:

UINT16 write_addled_double(UINT16 field_id, UINT8* data)
{

A "write_addled_array" function is a generic function that is used to write an array to the configuration file on the SPI Key and applying any necessary conversion. An example implementation for declaring this function is written in the C programming language as follows:

UINT16 write_addled_array(UINT16 field_id, UINT8 *data, UINT16 addle_type, int num_indices, . . . )

To use the facility, the software files are written in "C" or like program independent language that are included in the build of the software for the panel. The software is fully portable with only one file (spi_Key_low_level.c) requiring to be modified to suit the chosen platform. When writing the configuration to the SPI device, then the appropriate ADDLE functions must be used as described herein.

The language specified in the self describing data structure can only be added to. No item can be deleted, moved or new item inserted other than at the end of the definitions for the type, as this will impact the ability of the software to correctly interpret the data between previous versions.

Preferred embodiments and methods of the present invention discussed in the foregoing are to be understood as descriptions for illustrative purposes only, and it will be appreciated that numerous changes, substitutions, omissions, and updates thereof are possible without departing from the spirit and scope of the claims.

What is claimed is:

1. A method of storing configuration data for use in configuring an alarm panel while a program utilizing said configuration data is undergoing a revision within the alarm panel, said method comprising:

connecting a memory device directly to the alarm panel;

providing a data structure indicating a manner in which configuration data is to be stored, said data structure further comprising a class identifier for identifying each of a plurality of classes of information within the alarm panel, a number of items within each of the plurality of classes and a number of fields elements within the class wherein alarm zoning defines a class identifier of the plurality of classes within the alarm panel, a number of alarm zones defines the number of items within the alarm zoning class and alarm sensors within the alarm zones defines the number of field elements;

storing said data structure and current configuration data according to said data structure within the memory device;

enabling a revised software program in said device to identify the data structure and access a particular configuration data, along with its format within the memory device; and, applying a conversion function that translates the stored current configuration data within the alarm panel to a format compatible for use by the revised software, whereby access to the stored data is achieved with no corruption of the configuration data.

2. The method as claimed in claim 1, wherein said configuration data is temporary stored remote from or stored at the device.

3. The method as claimed in claim 1, wherein said data structure includes data self describing said stored current configuration data, said conversion function:

utilizing said self describing information about said stored configuration data; and automatically mapping the stored information, of the stored current configuration data, to the relevant parts of currently active data in said device executing said revised program, said conversion function rendering device configuration data information to be platform independent.

4. The method as claimed in claim 3, wherein said self describing data comprises: one or more ETYMON structures each describing the configuration data for said device including: a number of individual structures (ITEMs), and a number of discrete data items (FIELDS) that make up an ITEM, thereby providing a summary of what current configuration data is stored.

5. The method as claimed in claim 4, wherein said self describing data further comprises: a MORPHEME structure indicating the identity of one or more FIELDS(ID); a type of the field (TYPE), and, a size used for the data (SIZE).

6. The method as claimed in claim 5, wherein said current configuration data is stored according to a pattern: E, nMD, E, nMD, E, nMD, E, nMD, E, nMD, E, nMD, E, nMD, etc. where an Etymon is identified by E and nMD represents a number of Morpheme/Configuration Data couplets being stored according to a number of ITEMs indicated in said ETYMON structure, where n is an integer $\geq$ than 1.

7. The method as claimed in claim 5, wherein a field TYPE comprises a data type for use within the device, said data types including: 8 bit signed integers, 8 bit unsigned integers, characters, 16 bit signed integers, 16 bit unsigned integer, 32 bit signed integer, 32 bit unsigned integer, 64 bit signed integer, 64 bit unsigned integer, float, array, double, group map, string, or a mask test.

8. The method as claimed in claim 3, wherein said conversion function implements logic adapted for translating arrays with dimensional difference between device program revisions, said data structure defined as array type having a number of elements stored with the details of what dimension it represents.

9. A program storage device readable by a machine storing a program of instructions executable by the machine to perform method steps for storing configuration data for use in configuring an alarm panel while a program utilizing said configuration data is undergoing a revision, said method steps including the steps of:

provideing a data structure indicating a manner in which configuration data is to be stored, said data structure further comprising a class identifier for identifying each of a plurality of classes of information within the alarm panel, a number of items within each of the plurality of classes and a number of fields elements within the class wherein alarm zoning defines a class identifier of the plurality of classes within the alarm panel, a number of alarm zones defines the number of items within the alarm zoning class and alarm sensors within the alarm zones defines the number of field elements;

storing said data structure and current configuration data according to said data structure within the program storage device;

connecting the program storage device directly to the alarm panel;

enabling a revised software program in said alarm panel to identify the data structure and access a particular configuration data, along with its format within the program storage device; and, applying a conversion function within the alarm panel that translates the stored current configuration data to a format compatible for use by the revised software, whereby access to the stored data is achieved with no corruption of the configuration data.

10. The program storage device readable by a machine as claimed in claim 9, wherein said configuration data is temporary stored remote from or stored at the device.

11. The program storage device readable by a machine as claimed in claim 9, wherein said data structure includes data self describing said stored current configuration data, said conversion function:

utilizing said self describing information about said stored configuration data; and automatically mapping the stored information, of the stored current configuration data, to the relevant parts of currently active data in said device executing said revised program.

12. The program storage device readable by a machine as claimed in claim 11, wherein said self describing data comprises: one or more ETYMON structures each describing the configuration data for said device including: a number of individual structures (ITEMs), and a number of discrete data items (FIELDS) that make up an ITEM, thereby providing a summary of what current configuration data is stored.

13. The program storage device readable by a machine as claimed in claim 12, wherein said self describing data further comprises: a MORPHEME structure indicating the identity of one or more FIELDS; a type of the field (TYPE), and, a size used for the data (SIZE).

14. The program storage device readable by a machine as claimed in claim 13, wherein said current configuration data is stored according to a pattern: E, nMD, E, nMD, E, nMD, E, nMD, E, nMD, E, nMD, E, nMD, etc. where an Etymon is identified by E and nMD represents a number of Morpheme/Configuration Data couplets being stored according to a number of ITEMs indicated in said ETYMON structure, where n is an integer $\geq$ than 1.

15. The program storage device readable by a machine as claimed in claim 13, wherein a field TYPE comprises a data type for use within the device, said data types including: 8 bit signed integers, 8 bit unsigned integers, characters, 16 bit signed integers, 16 bit unsigned integer, 32 bit signed integer, 32 bit unsigned integer, 64 bit signed integer, 64 bit unsigned integer, float, array, double, group map, string, or a mask test.

16. The program storage device readable by a machine as claimed in claim 12, wherein said conversion function implements logic adapted for translating arrays with dimensional difference between device program revisions, said data structure defined as an array type having a number of elements stored with the details of what dimension it represents.

17. A method for saving and restoring alarm panel configuration data provided in a security system when making new panel software updates; said method comprising:

providing a memory storage means for storing alarm panel configuration data according to an ordered pattern indicated by a first data structure wherein said first data structure further comprising a class identifier for identifying each of a plurality of classes of information within the alarm panel, a number of items within each of the plurality of classes and a number of fields elements within the class wherein alarm zoning defines a class identifier of the plurality of classes within the alarm panel, a number of alarm zones defines the number of items within the alarm zoning class and alarm sensors within the alarm zones defines the number of field element;

connecting the memory storage means directly to the alarm panel;

utilizing said first data structure to facilitate read/write access to said stored alarm panel configuration data; and performing a conversion of a format of said alarm panel configuration data within the alarm panel in response to a panel software update.

18. A method for saving and restoring alarm panel configuration data as claimed in claim 17, wherein said first data structure comprises: an Identifier for indicating a class of stored panel configuration data to be used by alarm panel; a first count as to the actual number of ITEMS represented by said class; and a second count of the number of discrete data items that make up an individual item, thereby providing a summary of what current alarm panel configuration data is being stored.

19. The method as claimed in claim 17, further comprising providing one or more second data structures comprising, for each ITEM in said first data structure, the identity of one or more FIELDS (ID) and a field type (TYPE) indicating a data type including: 8 bit signed integers, 8 bit unsigned integers, characters, 16 bit signed integers, 16 bit unsigned integer, 32 bit signed integer, 32 bit unsigned integer, 64 bit signed integer, 64 bit unsigned integer, float, array, double, group map, string, or a mask test.

20. The method as claimed in claim 17, wherein said performing a conversion includes: executing a function implementing logic adapted for translating arrays with dimensional difference between device program revisions, said data structure defined as an array type having a number of elements stored with the details of what dimension it represents.

21. A computer readable medium encoded with a data structure for self describing configuration data information in a device within an alarm panel being updated with a software or hardware revision, said computer readable medium having computer readable program for operating on a computer, said data structure comprising:

one or more ETYMON structures stored on the computer readable memory device, said one or more ETYMON structures describing configuration data for the alarm panel, each said ETYMON structure describing a number of individual structures (ITEMs), and a number of discrete data items (FIELDS) that make up an ITEM wherein alarm zoning defines an ETYMON structure of the one or more ETYMON structures, a number of alarm zones defines the number of ITEMS of the ETYMON structure and identifiers of alarm detectors within the alarm zones defines the number of FIELDS, thereby providing a summary of how alarm panel data is stored in a storage device; and, one or more MORPHEME structures, said one or more MORPHEME structures indicating the identity of one or more FIELDS, a type of the field (TYPE), and, a size used for the data (SIZE) for each ITEM in an ETYMON structure for storage in said storage device;

wherein connecting said computer readable medium to the alarm panel causes said program and said data structure to enable a revisioned device within the alarm panel to identify a particular piece of data configuration, along with its format; and, apply the appropriate conversion function for translating the stored data to the correct format for the current revisioned device trying to read the stored data.

22. The computer readable medium encoded with a data structure for self describing configuration data information according to claim 21, wherein a pattern governed by said one or more ETYMON and MORPHEME structures includes: E, nMD, E, nMD, E, nMD, E, I~MD, E, nMD, E, nMD, E, nMD, etc. where E identifies an Etymon structure and IflVID represents a number of Morpheme/Configuration Data couplets being stored according to a number of ITEMs indicated in said ETYMON structure, where n is an integer > than 1.

23. The computer readable medium encoded with a data structure for self describing configuration data information according to claim 21, wherein said stored configuration data governed by said pattern is accessible by a conversion function for performing conversion if data format changes in said device being upgraded.

24. A system for upgrading software on a device which is being revisioned within an alarm panel, said system comprising:

a data storage device connected directly to the alarm panel for storing configuration data according to a predefined format defined by a data structure, said data structure further comprising a class identifier for identifying each of a plurality of classes of information within the alarm panel, a number of items within each of the plurality of classes and a number of fields elements within the class wherein alarm zoning defines a class identifier of the plurality of classes within the alarm panel, a number of alarm zones defines the number of items within the alarm zoning class and alarm sensors within the alarm zones defines the number of field elements;

means implementing logic on a computer within the alarm panel for enabling a newer version of software to identify a particular piece of configuration data stored on the data storage device, along with a format of said configuration data according to said data structure, and, apply an appropriate conversion function for translating the stored data to the correct format for the current revisioned device within the alarm panel trying to read the stored data whereby access to the stored data is achieved with no corruption of the configuration data, wherein the translated stored data from the directly connected data storage device upgrades the software on the device.

25. The system as claimed in claim 24, wherein said data storage device is associated with or remote from the device being revisioned.

26. The system as claimed in claim 24, wherein said data structure includes data self describing said stored current configuration data, said conversion function: utilizing said self describing information about said stored configuration data; and automatically mapping the stored information, of the stored current configuration data to the relevant parts of currently active data in said device being revisioned, said conversion function rendering configuration data information to be platform independent.

27. The system as claimed in claim 26, wherein said self describing data comprises: one or more ETYMON structures each describing the configuration data for said device including: a number of individual structures (ITEMs), and a number of discrete data items (FIELDS) that make up an ITEM, thereby providing a summary of what current configuration data is stored.

28. The system as in claim 27, wherein said self describing data further comprises: a MORPHEME structure indicating the identity of one or more FIELDS (ID); a type of the field (TYPE), and, a size used for the data (SIZE).

29. The system as claimed in claim 28, wherein said predefined format comprises a pattern: E, nMD, E, nMD, E, nMD, E, nMD, E, nMD, E, nMD, E, nMD, etc. where E identifies an Etymon structure and nMD represents a number of Morpheme/Configuration Data couplets being stored according to a number of ITEMs indicated in said ETYMON structure, where n is an integer $\geq$ than 1.

* * * * *